Aug. 16, 1932.  W. WILSON  1,872,545
MEANS TO PREVENT REVERSE ROTATION OF ROTARY MEMBERS
Filed June 15, 1929  3 Sheets-Sheet 1

INVENTOR
WILLIAM WILSON.
BY
ATTORNEY

Patented Aug. 16, 1932

1,872,545

UNITED STATES PATENT OFFICE

WILLIAM WILSON, OF DETROIT, MICHIGAN, ASSIGNOR TO CHRYSLER CORPORATION, OF DETROIT, MICHIGAN, A CORPORATION OF DELAWARE

MEANS TO PREVENT REVERSE ROTATION OF ROTARY MEMBERS

Application filed June 15, 1929. Serial No. 371,268.

This invention relates to a mechanism for preventing a motor vehicle from rolling rearwardly except when the power transmission gears are shifted to reverse position or when the mechanism is rendered inoperative by manually operated means which is independent of the reverse gearing.

The main objects of this invention are to provide an improved device for normally restraining rotation in one direction of a rotating member; to provide improved means for rendering such a device inoperative at will; to provide an improved device of this character which will meet the strict requirements of scientific engineering; and to provide an improved mechanism of this character which is particularly suitable for use on a motor vehicle in conjunction with the power transmission mechanism thereof.

An illustrative embodiment of this invention is shown in the accompanying drawings, in which.

Figure 1:
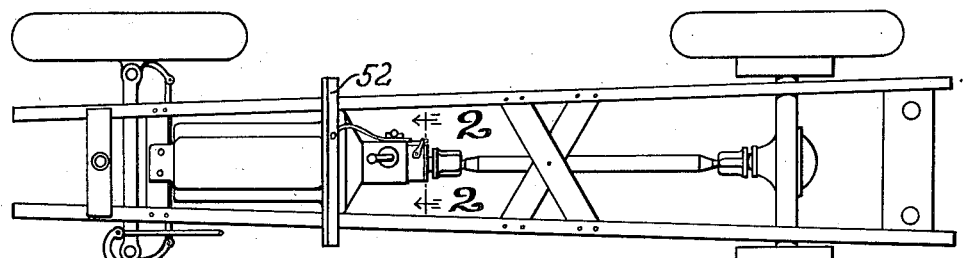
Fig. 1 is a top plan view of a motor vehicle chassis with my improved invention embodied thereon.

Heretofore in the construction of devices of this character which prevent the backward rolling of a motor vehicle except when the gears are shifted to reverse position, there has been considerable objection to the fact that when it is desired to push the car around by hand, such as when it is in a garage or on docks preparatory to boat shipping, it has been necessary for one man to get in the driver's seat, shift into reverse and hold the clutch out of engagement while another man or men pushed the car backward. In other words, cars equipped with such devices have required at least two men for manually moving them them except in a forward direction.

Furthermore, it is highly desirable that when cars are parked in cities or municipalities that the car be left so that it can be rolled freely in either direction, so that in case of fire or the like either firemen or policemen can readily move the car out of the way in either forward or backward direction.

In the present construction means have been provided for manually rendering the mechanism inoperative independently of the reverse gear mechanism so that one man can roll the car backward.

In mechanisms of the present character wherein a movable wedge cooperates with a roller for preventing backward rotation of a rotary member, positive connecting means between the wedge shifting cam and the gear shift mechanism have proven to be inoperative and impractical for the reason that when the transmission mechanism is in reverse gear and the sliding wedge moved to inoperative position, if it is desired to shift the transmission into any of the forward gears initial movement of the mechanism from reverse position jams the locking roller between the wedge and the rotating member and prevents further movement thereof until the rotating member has been turned in a forward direction. Inasmuch as the transmission mechanism cannot be shifted into any of the forward positions, the device is thus rendered inoperative.

In the present construction abutting connection only is made between the transmission shifting mechanism and the wedge shifting parts so that the transmission mechanism may be freely shifted into any one of the forward speeds and thereafter automatic yielding means move the wedge into operative position after the locking roller therein has been moved to its proper position.

In the construction shown in the drawings, my improved device is shown mounted on the rear end of the transmission gear case and comprises a housing 8, within which is mounted an elongated ring like cage 9 in vertical position, which normally rests on bearing seats 10 and 11 and which is slidable upon spaced parallel bearing surfaces 12 and 13. The cage 9 fits snugly between the bearing faces 12 and 13 and is prevented from rotating relatively to the housing 8 thereby.

The lower part of the cage 9 is provided on its inner side with a semi-annular bearing surface 14, which embraces an annular rotating member 15 secured to the rear axle propeller shaft 16 by splines or the like 17. A clearance of .002 of an inch is normally provided between the outer periphery of the rotating member 15 and the bearing surface 14 of the cage 9. A helical compression spring 18 is provided at the top side of the cage 9 and bears between said cage and the under side of a fitting 19 threaded into the top housing 8. A lubricating nipple 20 is threaded in the fitting 19 and may be of any suitable design.

The upper side of the cage 9 is provided with a bearing surface having lands and grooves 21 and 22 transversely disposed thereon, the general plane of said bearing surface being inclined inwardly with respect to the direction of normal rotation of the rotating member 15. A kerf 23 is milled in the bearing surface for conducting lubricant from an aperture 24 drilled through the cage 9 in alignment with the lubricating nipple 20, the upper end of said aperture terminating in a counterbore seat 25 in which rests the lower end of the compression spring 18.

Figure 2:
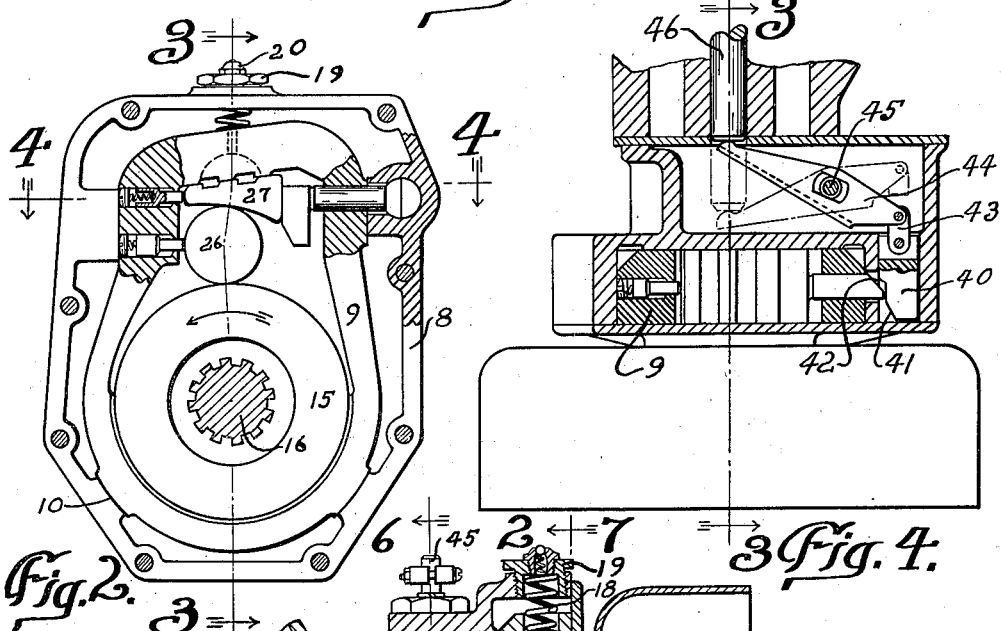
Fig. 2 is an enlarged sectional detail taken on the line 2—2 of Fig. 1.
Figure 3:
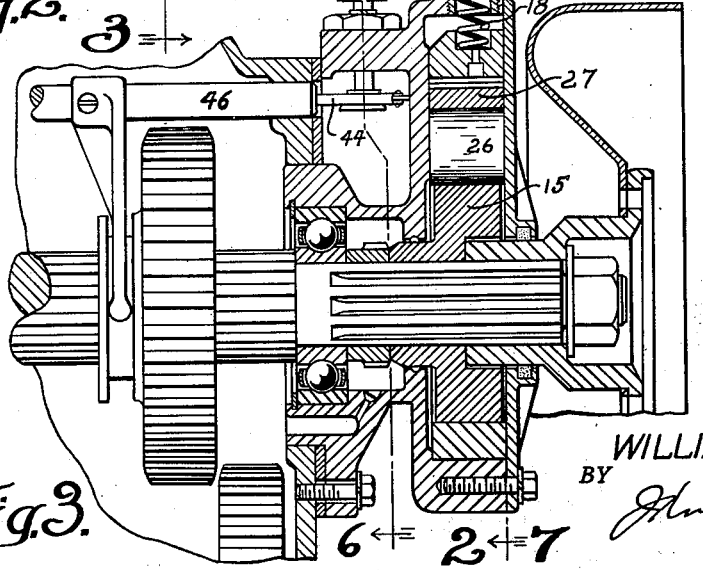
Fig. 3 is a sectional view taken on the line 3—3 of Fig. 4.
Figure 5:
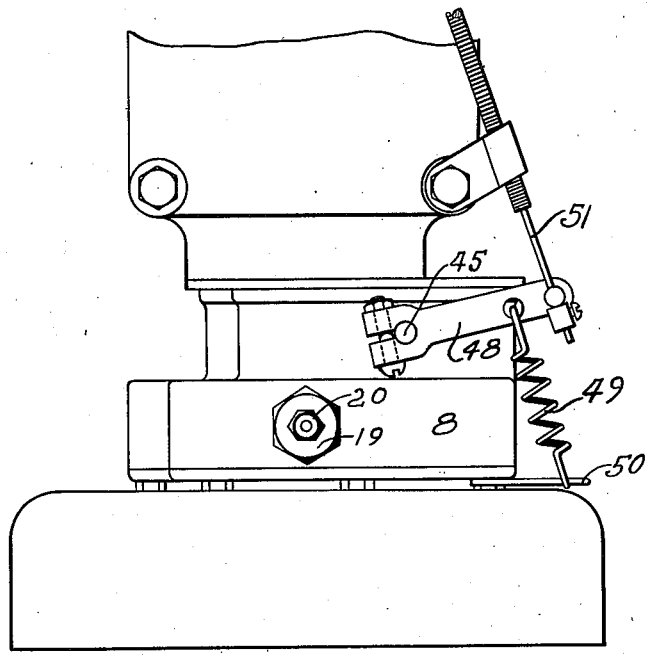
Fig. 5 is an enlarged top plan view of my improved device.
Figure 6:
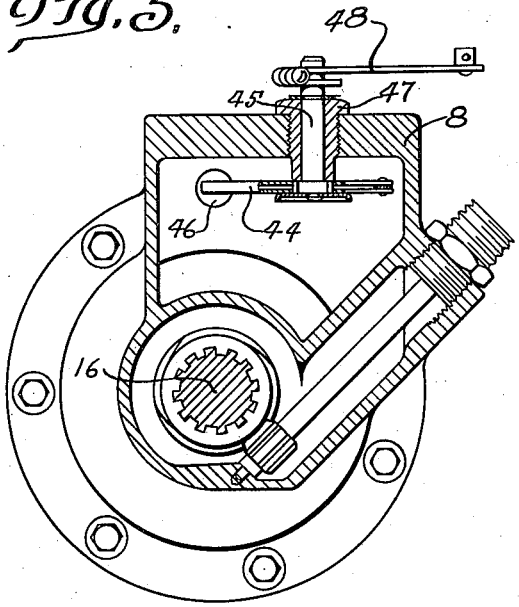
Fig. 6 is a sectional view taken on the line 6—6 of Fig. 3.
Figure 7:
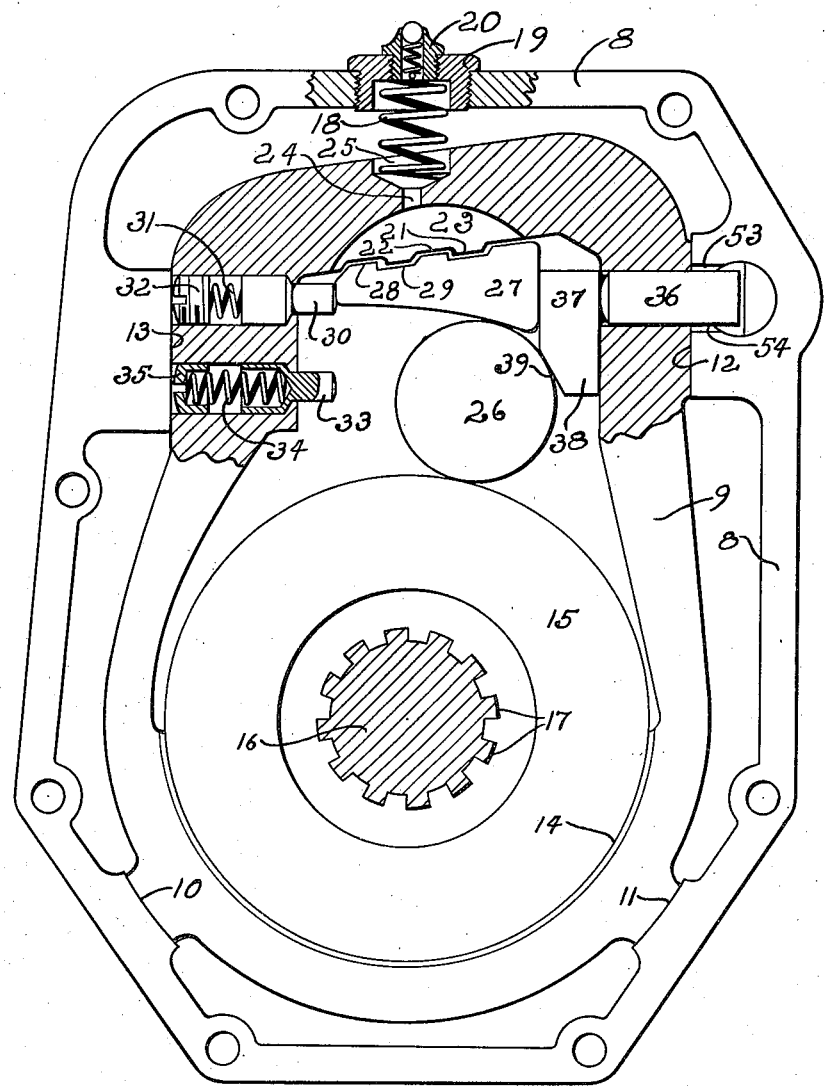
Fig. 7 is an enlarged sectional view taken on the line 7—7 of Fig. 3.

An annular member in the form of a hardened steel roller 26 is provided within the cage 9 and in position to normally rest on and be supported by the upper side of the rotating member 15. Means are provided for cramping this roller against the outer peripherial surface of the rotating member 15 and comprise a wedge member 27 slidably mounted between the roller 26 and the inwardly inclined bearing surface of the cage. The upper side of the wedge 27 is provided with lands and grooves 28 and 29, which are complementary to the lands and grooves 21 and 22 so that when the wedge 27 is in one position the lands and grooves are in loose interfitting relationship, as shown in Fig. 7 of the drawings, and when said wedge is in its other position the lands of the wedge are in engagement with the lands of the inclined bearing surface, as shown in Fig. 2 of the drawings. The lower side of the wedge 27 is curved so as to aid in locking the roller 26 with respect to the rotating member 15.

Means are provided for yieldingly urging the wedge 27 to its inoperative position and comprise a plunger 30 normally pressed inwardly by a helical compression spring 31 secured by a plug 32 threaded into the outer end of the bore within which the plunger 30 is slidable. A similar plunger 33 is slidably mounted in the cage 9 and pressed inwardly by a helical compression spring 34 retained by a threaded plug 35 for bearing against the roller 26 and holding the same in snug relationship between the wedge 27 and the outer periphery of the member 15, as shown in Fig. 2 of the drawings, when said wedge is in operative position.

Opposed to the plunger 30 is a plunger 36 axially slidable in the cage 9 and provided with a head 37 having a depending portion 38 which is embraced at its opposite sides by the housing 8 for preventing rotation of the plunger 36. The lower front corner of the head 37 is chamfered to provide an inclined bearing surface 39 against which the roller 26 rests, as shown in Fig. 7, when the wedge 27 is in inoperative position.

Means are provided for sliding the plunger 36 inwardly for moving the wedge 27 to operative position and comprise a transversely disposed plunger 40 mounted in the housing 8, one end of which adjacent the plunger 36 is beveled at 41 to cooperate with a beveled surface 42 on the end of the plunger 36 opposite to the head 37. The other end of the plunger 40 is provided with a link 43, which provides pivotal connection between said plunger and one end of a horizontally swingable lever 44 rigidly mounted on a vertically disposed post 45. The opposite end of the lever 44 is positioned so as to be engaged by a transmission shifter fork bar 46, which bar is adapted to be slid rearwardly when the reverse gears of the transmission are put in mesh.

The post 45 is journaled in a fitting 47 threaded through the top of the housing 8 and the upper end of said post projects above said fitting and is provided with an arm 48 rigidly secured thereon. A helical tension spring 49 has one end thereof fastened to the arm 48 and the other end thereof secured to a rigidly mounted clip 50 mounted on the housing 8, for normally urging said arm in a direction to carry the plunger 40 inwardly and thereby cam the plunger 36 inwardly against the wedge 27. The tension spring 49 and its leverage on the arm 48 is of sufficient strength to overcome the strength of the compression spring 31 so that the wedge 27 is moved inwardly to effective position automatically by the tension spring 49 when the shifter fork bar 46 is not in reverse position.

Means are provided for manually rendering the tension spring 49 ineffective independently of the reverse gear shifter bar and comprise a Bowden wire 51 having one end connected to the outer end of the arm 48 and the other end thereof terminating on the dash board 52 or other convenient part of the vehicle.

Figure 4:
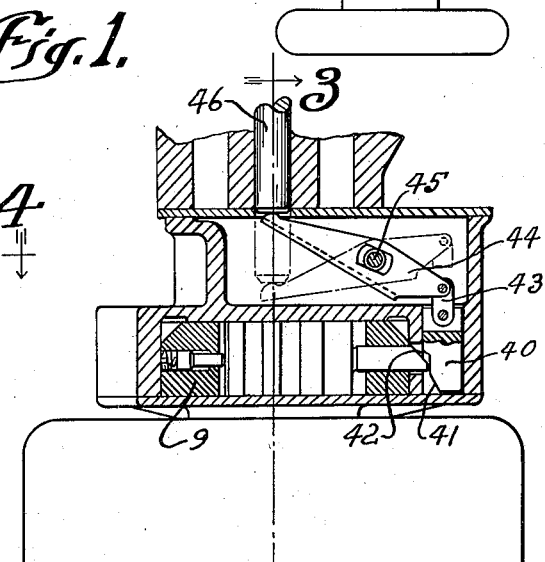
Fig. 4 is a sectional view taken on the line 4—4 of Fig. 2.

In the operation of this device when the gear shifting mechanism of the motor vehicle is in neutral or in any of the forward gear positions, the tension spring 49 acting through the arm 48, post 45 and link 43, keeps the plunger 40 in an inward position, as shown in Figs. 2 and 4 of the drawings, thus holding the plunger 36 and wedge 27 in a position where the lands of the wedge ride on the lands 21 of the cage 9. When in such position the roller 26 is to the left of the vertical center line of the rotating member 15 and in engagement with the spring actuated plunger 33, as shown in Fig. 2. When in such position the member 15 is free to rotate in the direction of the arrow shown in Fig. 2, but when the member 15 attempts to rotate in the opposite direction, the roller 26 is cramped or locked between the surface of the member 15 and the lower curved surface of the wedge 27 thereby preventing rotation in a reverse direction.

Upon engagement of the roller in this manner the cage 9 shifts upwardly vertically against the action of the compression spring 18 so as to bring the semi-annular bearing surface 14 of the cage into engagement with the side of the rotating member 15 opposite to the point of contact of the roller 26, thereby eliminating any side strain or throwing out of alignment of the shaft 16 which carries the member 15. Upward movement of the cage 9 with respect to the housing 8 is permitted without any shearing action on the plunger 36 by providing suitable clearance, as shown at 53 and 54 in the housing at the point where the plunger extends thereinto.

When the transmission is shifted into reverse the shifter fork bar 46 moves rearwardly and by abutting against the outer end of the lever 44 swings said lever to the position as shown in the dotted line in Fig. 4 thereby withdrawing the plunger 40 and permitting the compression spring 31 to move the wedge 27 and plunger 36 to the position shown in Fig. 7 of the drawings. The lands and grooves of the wedge 27 have loose interfitting relation with the lands and grooves of the inclined bearing surface of the cage 9 and the roller 26 rests against the chamfered bearing surface 39 of the head 37. When the roller 26 is in this position the rotating member 15 may be freely revolved in a reverse direction.

Upon shifting the transmission mechanism into neutral or into any of the forward gear positions, the bar 46 moves forwardly and the tension spring 49, operating through the arm 48 and post 45, lever 44 and plunger 40, tends to cam the plunger 36 inwardly to return the wedge 27 to its normal effective position. Initial movement of these parts take place at once until the roller 26 becomes cramped between the wedge 27 and member 15. Upon forward movement of the rotating member 15, such as moving the motor vehicle forwardly, the roller 26 is carried toward the spring plunger 33 and at such time the tension spring 49 moves the plunger 40 inwardly to its limit of travel, thus camming the plunger 36 and wedge 27 to their effective positions.

When it is desired to render this mechanism inoperative and ineffective independently of the reverse gear mechanism, such as in parking or in a garage, the Bowden wire control 51 is manually manipulated to swing the arm 48 against the action of the spring 49 and thus rotate the lever 44 to the same position as when moved by the shifter fork bar 46.

The parts of this mechanism are adequately lubricated through the nipple 20, the lubricant passing down through the coils of the spring 18 to the socket 25 from where it passes through the aperture 24 into the kerf 23. As the lubricant passes into the kerf it spreads out in both directions and lubricates the upper surface of the wedge 27, excess lubricant therefrom dripping off down over the various parts.

Although but one specific embodiment of this invention has been herein shown and described, it will be understood that numerous details of the construction shown and described may be altered or omitted without departing from the spirit of this invention as defined by the following claims.

What I claim is:

1. In a device of the class described, a rotary member, an annular member contacting therewith, a wedge member for cramping said annular member against said rotating member to prevent rotation thereof in one direction, yielding means bearing upon one end of said wedge member for urging it to a non-effective position, and automatic yielding means of greater strength than the aforesaid yielding means bearing upon the other end of said wedge member for urging it to an effective position.

2. In a device of the class described, a rotary member, an annular member contacting therewith, a wedge member for cramping said annular member against said rotating member to prevent rotation thereof in one direction, a pair of yielding means bearing upon said wedge member from respectively opposite directions for shiftably supporting said wedge member, one of said means being of greater strength than the other for urging said wedge to effective position, and manually operable means for retracting the latter means.

3. A device of the class described, comprising a housing, a rotary member journaled in said housing, a cage movable in said housing transversely of the axis of rotation of said rotating member, said cage embracing said rotating member and being restrained from rotation therewith by said housing, an annular member seated upon said rotating member, a pair of spaced yielding members, and a floating wedge member seated upon said annular member and engaged between said yielding members, one of said yielding members normally cramming said wedge member between said annular member and a wall of said cage for restraining rotation of said rotary member in one direction.

4. A device of the class described, comprising a housing, a rotating member journaled in said housing, a cage movable in said housing transversely to the axis of rotation of said member, said cage embracing said member and being restrained from rotation therewith by said housing, a seat on said cage having lands and grooves thereon, a wedge member in said cage having lands and grooves adapted to register with the grooves and lands respectively of said seat, an annular member normally bearing between said wedge member and said rotating member for restraining rotation of said rotating member in one direction and permitting rotation thereof in the other direction, automatic yielding means for moving said wedge member so as to register the lands of said seat and wedge member for placing the latter in an operative position, and yielding means for urging said wedge member to noneffective position.

5. A device of the class described, comprising a housing, a rotating member journaled in said housing, a cage movable in said housing transversely to the axis of rotation of said member, said cage embracing said member and being restrained from rotation therewith by said housing, a seat on said case having lands and grooves thereon, a wedge member in said cage having lands and grooves adapted to register with the grooves and lands respectively of said seat, an annular member normally bearing between said wedge member and said rotating member for restraining rotation of said rotating member in one direction and permitting rotation thereof in the other direction, automatic yielding means for moving said wedge member so as to register the lands of said seat and wedge member for placing the latter in an operative position, and yielding means for moving said cage to have clearance with said rotating member when said member is being rotated in one direction.

6. A device of the class described, comprising a housing, a rotating member journaled in said housing, a cage movable in said housing transversely to the axis of rotation of said member, said cage embracing said member and being restrained from rotation therewith by said housing, said cage having a bearing surface inclined inwardly with respect to the direction of normal rotation of said rotating member, a wedge member slidably mounted at one side on said inclined bearing surface, a pair of yielding members bearing in respectively opposite directions on said wedge member, an annular member normally bearing between the other side of said wedge member and said rotating member for restraining rotation of said rotating member in one direction and permitting rotation thereof in the other direction, manually operable means for moving said wedge member to operative position, and means permitting said wedge member to be moved to non-effective position.

7. A device of the class described, comprising a housing, a rotating member journaled in said housing, a cage movable in said housing transversely to the axis of rotation of said member, said cage embracing said member and being restrained from rotation therewith by said housing, said cage having a bearing surface, a wedge member slidably mounted on said bearing surface, complementary lands and grooves on said cage and wedge member, means for moving said wedge member to a position where the lands and grooves on said cage interfit respectively with the lands and grooves on said wedge members, connections with the reverse gear mechanism for moving one of said members relatively to the other to cause the lands on one of said members to be in contact with the lands on the other of said members, an annular member interposed between said wedge member and said rotating member for preventing rotation of said rotating member in one direction when said lands are in contact with each other and for permitting rotation in both directions when said lands and grooves are in interfitting relationship.

8. A device of the class described, comprising a housing, a rotating member journaled in said housing, a cage in said housing surrounding said rotating member, an annular member in said cage contacting with said rotating member, a slidable wedge member bearing between said annular member and one side of said cage for camming said annular member into engagement with said rotating member, yielding means urging said wedge member to an ineffective position, a plunger slidably mounted in said cage having one end abutting against said wedge member, the other end of said plunger being beveled, a transversely disposed plunger slidably mounted in said housing having one end thereof beveled and positioned to cam said other plunger to move said wedge member, a link connected to the other end of said housing plunger, a lever having one end pivoted to said link, the other end of said shaft being adapted to be engaged by reverse gear connections, a shaft pivotally supporting said lever and rigidly secured thereto, said shaft extending through said housing and protruding therebeyond, and an arm secured to the protruding end of said shaft for moving said lever independently of said reverse gear connections.

9. A device of the class described, comprising a housing, a rotary member journaled in said housing, a cage movable in said housing transversely of the axis of rotation of said rotating member, said cage embracing said rotating member and being restrained from rotation therewith by said housing, an annular member seated upon said rotating member, a pair of spaced yielding members, a floating wedge member seated upon said annular member and engaged between said yielding members, one of said yielding members normally cramming said wedge member between said annular member and a wall of said cage for restraining rotation of said rotary member in one direction, and a means for rendering the latter yielding member inoperative so as to allow the other yielding member to hold said wedge in an inoperative position.

WILLIAM WILSON.